April 26, 1927.

R. G. CRITTALL ET AL 1,625,987

HEATING AND COOLING OF BUILDINGS

Filed Sept. 20, 1923

Patented Apr. 26, 1927.

1,625,987

UNITED STATES PATENT OFFICE.

RICHARD GODFREY CRITTALL AND JOSEPH LESLIE MUSGRAVE, OF LONDON, ENGLAND.

HEATING AND COOLING OF BUILDINGS.

Application filed September 20, 1923, Serial No. 663,863, and in Great Britain November 10, 1922.

This invention relates to the system of heating or cooling buildings by radiation from the walls, floors or ceilings.

According to this invention we embed in the plaster of the wall or ceiling or in the concrete forming the floor of a room or building a series of pipes formed somewhat like a grid—that is each pipe communicates at either end with a header—into which grid water is introduced means being provided for this purpose and for the discharge of same. Passing into or through one or more of the pipes, which is preferably of larger diameter than the others, or into or through the header of this grid is another pipe through which latter pipe steam, hot water or other heated fluid or gas is circulated. Or if for cooling a cold fluid or gas is circulated through this pipe. Or instead of circulating a heating fluid through this pipe an electrically heated element may be introduced into one or more of the pipes or into the header.

The heated fluid heats the pipe through which it passes and the heat given off by this pipe or the heat from the electrically heated element heats the water in the grid causing such water to circulate in such grid, consequently the whole of the grid becomes uniformly heated, and as the grid is embedded in the plaster of the wall or in concrete such heat radiates from the surface of said wall into the room or building. Provision is made in the headers or in one or more of the pipes to allow for increase in the volume of water as it becomes heated in said grid.

The invention is illustrated on the accompanying drawing.

A represents the wall or structure, B the grid or pipes into which the water to be heated is introduced, D the pipe through which the fluid that heats the water in the grid circulates, E the pipe into which the electrically heated element is introduced, $a'$ the material in which the grid is embedded, and $a^2$ the plaster or finished surface from which the heat radiates.

Figure 1:
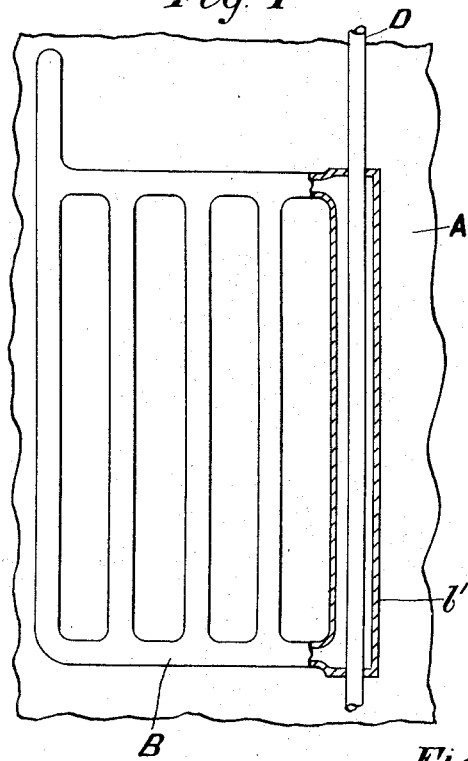
Fig. 1 is a broken view of a portion of the wall or structure showing how the water contained in the grid is heated and caused to circulate by the circulation of the heated fluid in a pipe passing through said grid.
Figure 2:
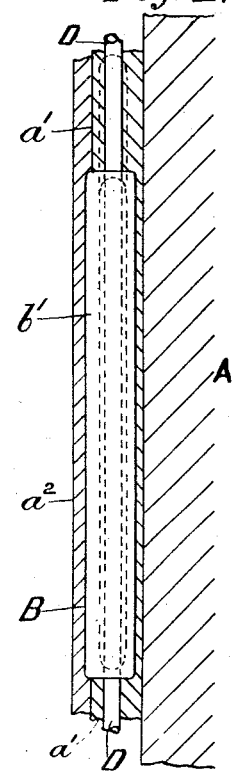
Fig. 2 is a broken sectional side elevation of a portion of a wall from the surface of which the heat radiates.

In the example illustrated by Figs. 1 and 2 we have shown how the water contained in the grid B is heated and kept in circulation by the heat given off from a heated fluid circulating through the pipe D. This pipe D passes through the pipe $b'$ of the grid, which is preferably larger than the other pipes forming the grid, the heated fluid or gas which circulates through this pipe D being derived from any convenient source.

Figure 3:
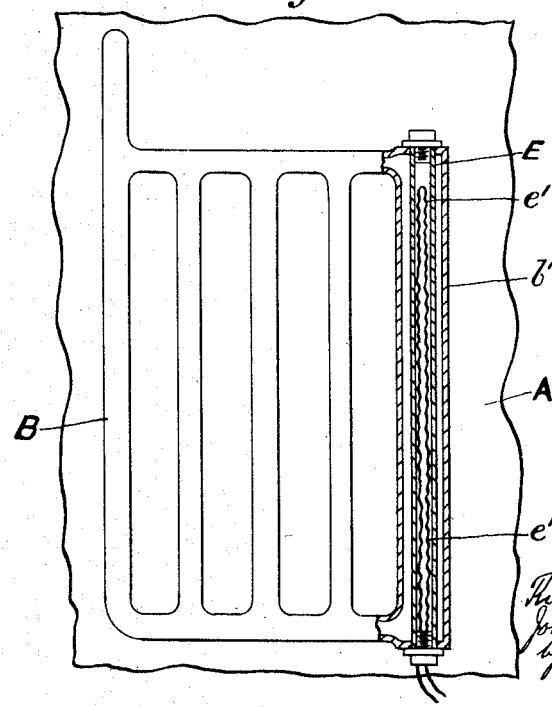
Fig. 3 is a similar view to Fig. 1 showing how the water contained in the grid is heated and caused to circulate by an electrically heated element.

At Fig. 3 we have shown an electrically heated element $e'$ for heating and maintaining the circulation of the water in the grid B. This electrical element $e'$ is enclosed in the tube E which is introduced into the pipe $b'$ of the grid.

What we claim as our invention and desire to secure by Letters Patent is:—

A heat exchange device comprising a hollow liquid holding grid adapted especially to be embedded in a concrete wall and having a plurality of vertical portions and upper and lower horizontal headers connected to the ends of said vertical portions, and means for changing the temperature of and causing the circulation of liquid in said grid including a pipe extending vertically through one of said vertical portions and adapted to contain a medium of a different temperature than the liquid in said grid.

In testimony whereof we have signed our names to this specification.

RICHARD GODFREY CRITTALL.
JOSEPH LESLIE MUSGRAVE.